Oct. 30, 1934.  C. H. PLUMMER  1,979,078
PEA VINING AND THRESHING PROCESS AND APPARATUS
Filed Oct. 15, 1931  3 Sheets-Sheet 1

Oct. 30, 1934.   C. H. PLUMMER   1,979,078
PEA VINING AND THRESHING PROCESS AND APPARATUS
Filed Oct. 15, 1931   3 Sheets-Sheet 2

Inventor
Clarence H. Plummer
By Wheeler, Wheeler & Wheeler
Attorneys

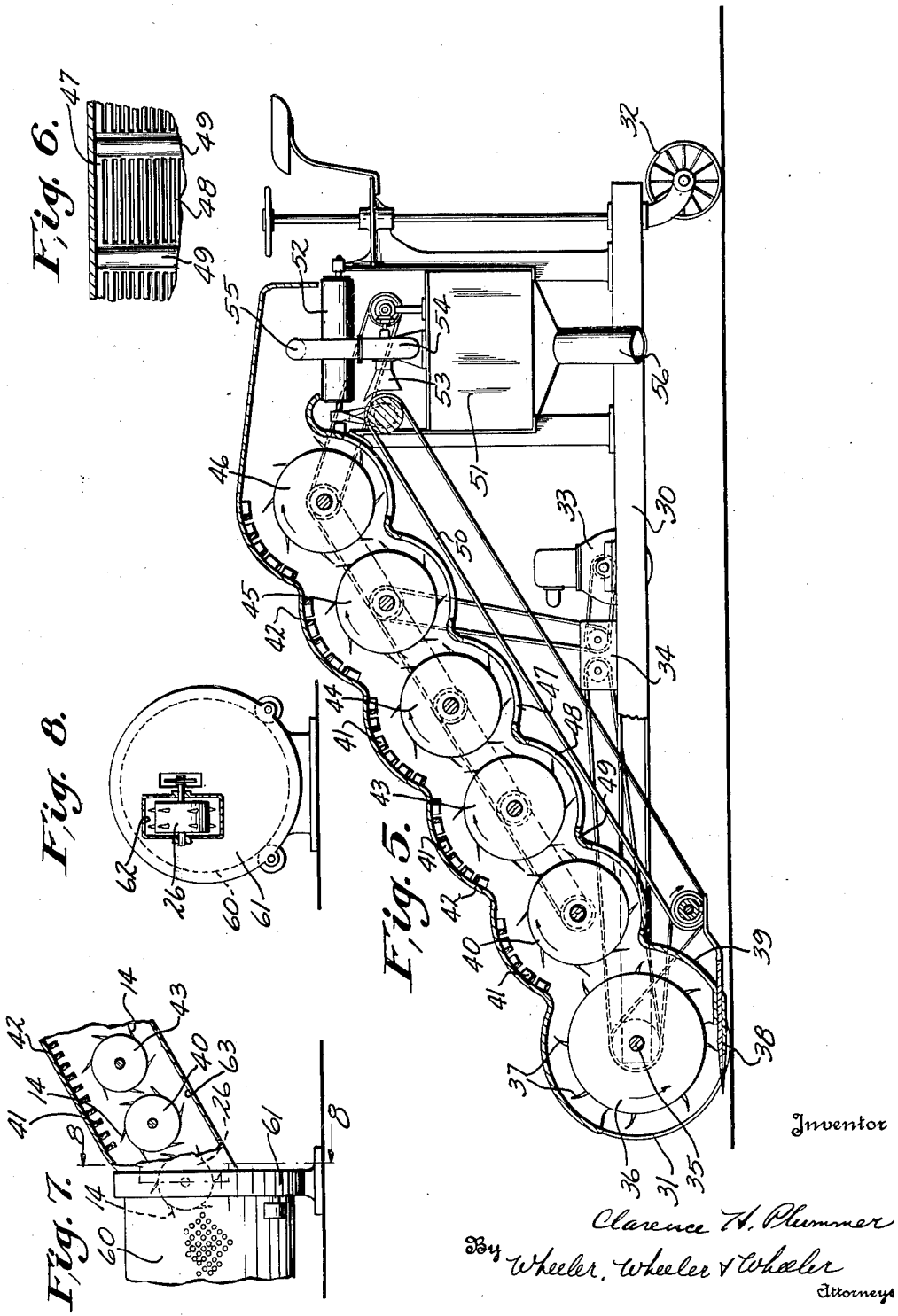

Patented Oct. 30, 1934

1,979,078

UNITED STATES PATENT OFFICE 1,979,078

PEA VINING AND THRESHING PROCESS AND APPARATUS

Clarence H. Plummer, Kewaunee, Wis.

Application October 15, 1931, Serial No. 568,946

13 Claims. (Cl. 130—30)

This invention relates to improvements in pea vining and threshing process and apparatus.

Existing apparatus in general use employs a rotary cylinder with an interior beater. The vines and peas are lifted by the cylinder and dropped across the path of the beater which flails the pods and vines to discharge the peas therefrom. In the use of such a machine the vines are crushed and bruised and there is a relatively high wastage of peas which fail to escape from the drum immediately following the threshing operation and are lifted and subjected to the direct crushing action of the beaters. Difficulties arise not merely in the destruction of the product through the direct flailing action of the beaters but also because the juices of the vines and crushed peas wet the peas which escape mutilation and thus immediately initiate flavor destroying chemical changes in the otherwise good peas.

Perhaps the most difficult part of the operations involved in threshing peas and preparing them for canning is to preserve the flavor. The "heating" which results from the presence of free juice on mechanically threshed peas is a well known source of deterioration. It is customary to conduct all operations at the very highest speed in order to avoid flavor changes and destruction from this phenomenon.

The present invention seeks to vine and thresh peas with a minimum of flavor change, a minimum of bruising, and a minimum of destruction and loss of the product. In achieving this objective it is my purpose to operate so far as possible, upon the pods rather than upon the vines or the previously threshed peas. I propose to hold the vines at a plurality of points, to project the pods centrifugally therefrom into contact with baffles which are stationary and hence do not lift the previously threshed product, and to remove the free peas immediately from the action of the machine.

It is my further purpose to be able to repeat the threshing operation for a plurality of times by means insuring the rearrangement and loose uncompacted condition of the vines. I propose, moreover, to conduct the threshing operations so efficiently as to make it practicable to use devices embodying this invention for the salvage of peas now being discharged as waste from existing viners.

In the drawings:

Figure 5 is an illustration partly in side elevation and partly in longitudinal section showing a combined harvesting and pea threshing machine.

Figure 6 is a detail view in plan of a fragment of the riddles through which threshed peas escape from the threshing chamber of the machine shown in Figure 5.

Figure 7 shows a further modification of the invention applied to the end of an existing viner to salvage waste therefrom, the parts being shown partially in side elevation and partially in longitudinal section.

Figure 8 is a view taken in section in the plane indicated at 8—8 in Figure 7.

Like parts are identified by the same reference characters.

Figure 1:
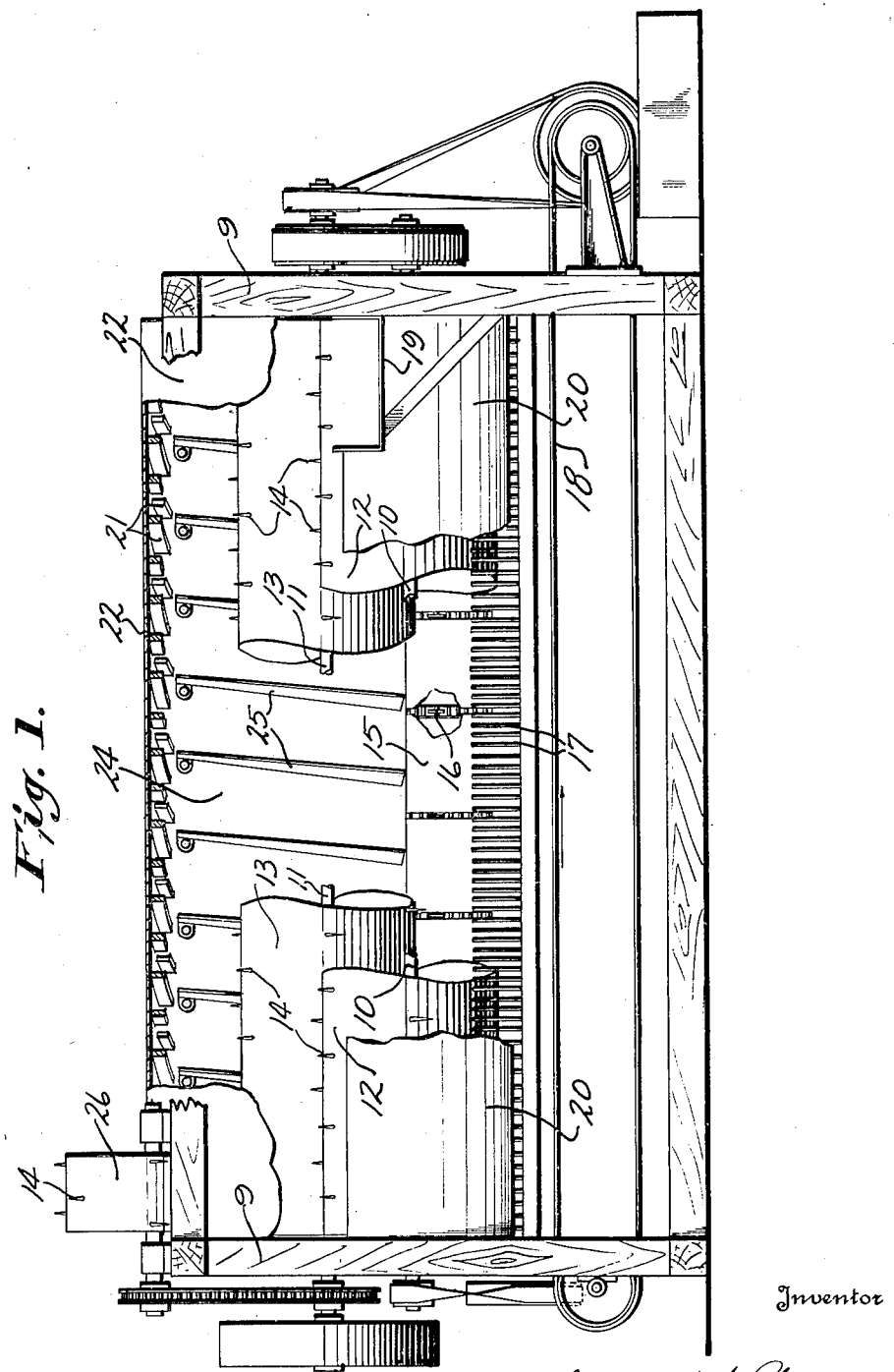
Figure 1 is a view showing a machine exemplifying this invention as it appears in side elevation with portions of its parts broken away to expose the interior mechanism.
Figure 2:
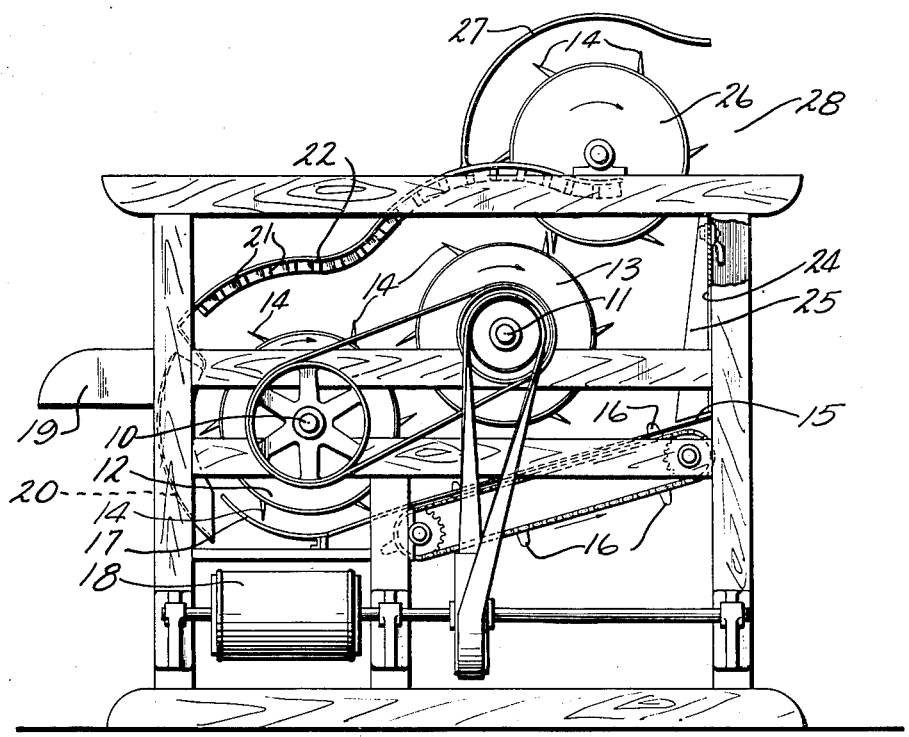
Figure 2 is an end elevation of the machine shown in Figure 1.

The device shown in Figures 1 and 2 is sufficiently small and compact to be portable but is not provided with wheels. Its frame 9 carries a plurality of longitudinally extending shafts 10 and 11 upon which are mounted for power rotation drums 12 and 13 extending the full length of the machine. The peripheries of these drums are provided with picker fingers or pegs which in actual practice are about six inches apart and about a quarter of an inch in cross section. The drums are of such size with reference to the spacing of their respective shafts that the circular paths traveled by the ends of the pins either intersect or are very close together. The drums preferably rotate clockwise as viewed in Figure 2 and their fingers or pegs 14 preferably have an inclination rearwardly with reference to the direction of rotation.

Beneath the drums 12 and 13 is an inclined table 15 extending the full length of the machine except for slots at intervals through which conveyor teeth 16 project to propel vines downwardly over the table toward drum 12. The lower margin of table 15 is provided with a set of arcuately curved riddle fingers 17 substantially concentric with drum 12. A conveyor 18 operates longitudinally of the margin to catch peas discharged between the riddle fingers 17.

Figure 3:
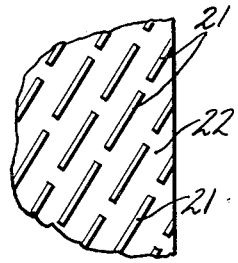
Figure 3 is a bottom plan view of a fragment of the baffle illustrated in Figures 1 and 2.
Figure 4:
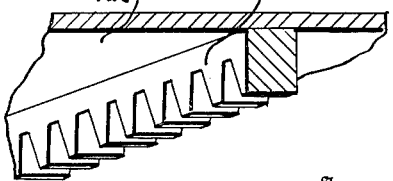
Figure 4 is a view in perspective illustrating a modified form of a baffle.

Vines are fed to the machine through a hopper 19 adjacent one end thereof, the front of the machine being otherwise closed by casing 20. As the vines are engaged by fingers 14 on drum 12 they are held at a number of points and whirled about drum 12 in the course of the rotation of said drum. In the course of such rotation the pods are caused to stand out centrifugally in a radial direction from drum 12 and strike the fixed baffles 21 carried by the upper casing member 22. The impact of the free swinging pod with the baffle causes the pod to open and to discharge its content of peas. The baffles may comprise strips of wood or rubber spaced in parallel rows preferably set to run angularly across the top casing member 22 toward the outlet of the machine. Instead of having smooth lower margins as shown in Figures 1, 2 and 3, the baffles may be formed of rubber or the like with toothed margins as shown at 21' in Figure 4. The saw-toothed baffle of soft material is particularly of value where it may be desired to remove the pods, unopened, from a vine without immediate threshing of the peas therefrom.

The upper casing element 22 is preferably so formed as to be approximately concentric to each of the drums 12 and 13 so that the pods are held to the baffles for repeated contact with successive baffles to ensure delivery of the peas.

Due to the rearward inclination of the teeth or fingers 14 on the drums 12 and 13, the vines are delivered readily from engagement with such teeth wherever the contour of the casing permits. After making a partial rotation on drum 12, the vines are discharged therefrom on drum 13. The tossing of the vines from one drum to another keeps them loose and stirs them up so that pods originally buried in the vines are repeatedly brought to the surface of the mass by successive tossing operations. On drum 13 the threshing operation above described is repeated and at the rear of the machine the vines are tossed clear of drum 13 into contact with the casing or wall 24 at the rear of the machine. This wall is also provided with baffles which extend approximately vertically but with a lateral inclination toward the outlet of the machine and bottom ends. These baffles are numbered 25 and as the pea vines are thrown against the rear wall of the machine they fall downwardly and are slightly advanced by the inclination of baffles 25 toward the outlet end of the machine.

When the vines drop on table 15 they are sufficiently below drum 13 so that the teeth thereof are not apt to catch in the vines. The conveyor 16 ensures the propulsion of the vines downwardly along the table toward drum 12 through the riddle portion 17 over which the threshed peas may escape as the vines are again caught on the teeth or fingers 14 of drum 12 and elevated for a repetition of the operations above described.

The drums and their picker fingers 14 do not act as beaters. The picker fingers 14 are of small cross section and enter the vines gently with no compacting or crushing tendency, but the sudden acceleration and tendency to rake out and separate them releases free peas and entangled pods, so that the pods are free to swing outwardly and upwardly by centrifugal force when they reach the enlarged space between the drum and the baffles 21. The vines are then thrown against the ribs 25 from the space underneath the falling peas.

After each tangential throwing operation, whereby the vines are propelled against the impact receiving ribs 25, the free peas are largely shaken out while the vines are dropping to the table 15, and these peas pass between the riddle fingers or bars 17 of the concave. The vines engaged or reengaged by the picker fingers are additionally shaken by these fingers to release entrained peas as the picker fingers lift the vines away from them and from fragments of leaves and pods. With each cycle of these operations, comprising one complete revolution of the vines, they are advanced along the axis of such revolution, whereby their movements in successive cycles do not interfere with the continuous introduction of unthreshed vines at the inlet end of the machine.

I am aware that vines, including pods, have been subjected to impacts by beating wings for the purpose of breaking or opening pods and releasing their contents. Such operations invariably crush vines, pods, and the contents of the pods to a considerable extent, whereas by my invention the material is not subjected to crushing pressures, nor even to beating impacts tending to compress the material. On the contrary, my improved method is one in which the vines are moved or lifted away from released material and carried along a curved path at a speed which tends to separate all the material, while permitting the heavier unopened pods to swing outwardly by centrifugal force to a greater extent than the lighter vines, thus accomplishing a temporary separation which permits the pods to be delivered against the baffles with a force determined by their own momentum and without any tendency to crush their contents. Before the released peas can drop into the vines the latter are thrown from beneath them against the ribs 25, from which they are directed toward the outlet end of the machine while the free peas are falling around the drum to the concave riddle bars between which they pass.

After repeated tossing of the vines by their successive engagement alternately on the pegs of drums 12 and 13, the inclination of the baffles 21 and 25 gradually works the vines to the delivery end of the machine. Here there is a discharge wheel or drum 26 formed with pegs, fingers or teeth 14, and just like drums 12 and 13 except for its more limited axial extent. The path of travel of the teeth over drum 26 is made to intersect the path of travel of the teeth over drum 13 so that as the vines reach the end of the machine they are positively stripped from drum 13 and carried by drum 26 about the interior of hood 27 to a discharge point at 28.

The driving connections are so clearly illustrated in Figures 1 and 2 as to require no specific description. The machine is preferably operated at such a speed that drum 12 will rotate about 100 to 150 R. P. M. and drum 13 at 300 to 350 R. P. M. Actual operation of the machine discloses that its operation is also free to an unheard of degree from bruising or destructive action either on the peas or vines. It is particularly to be observed that inasmuch as the baffles are non-rotatable and the pegs 14 can engage vines only, there is no means by which peas once threshed can again be subjected to the beating operation of the device.

The machine is inherently much smaller for a given capacity than any viner in current use and its great compactness makes possible the use of the machine on a combined harvester and thresher such as is disclosed in Figures 5 and 6.

In the combined harvester and thresher, a frame 30 having wheel supporting means 31 at its front and a steering wheel 32 at its rear, carries a prime mover 33 which is connected through transmission 34 to drive the front axle 35. On this axle is a gathering drum 36 which rotates in the same direction as the wheels of a vehicle during its forward propulsion, the direction of rotation being counter-clockwise as viewed in Figure 5. The teeth 37 of this gathering drum draw the vines to shear blades 38 which are positioned immediately adjacent the ground and close to the path of rotation of teeth 37 on gathering drum 36. As the vines are severed by the shears the teeth 37 lift them on the concentrically curved casing member 39 into the path of picking drum 40 which corresponds to the first picking drum 12 in Figure 2. The more rapid rotation of drum 40 causes the pods to stand out centrifugally for engagement with baffles 41 on the upper casing member 42. From drum 40 the vines pass in succession to drums 43, 44, 45 and 46, the number of drums preferably being greater to compensate for their shorter axial extent as compared to the machine shown in Figure 1.

Beneath the whole series of drums is a riddle 47 shown in detail in Figure 6 and having arcuately curved slotted portions 48 concentric with the respective drums and intervening reversely curved unslotted portions 49. All peas threshed during the entire operation immediately escape through the riddle and are discharged into a conveyor belt 50 whereby they are elevated to a position whence they may fall by gravity into hopper 51.

The vines are discharged at the top of the machine onto a cross conveyor belt 52 which discharges them rearwardly from the view point of Figure 5. I prefer to clean the peas of leaves and fragments of pods by causing them to drop from conveyor 50 past a hood 53 which is connected with the inlet of a centrifugal fan 54 discharging through pipe 55 along the path of discharge of the vines. As the peas fall through the mouth of hood 53 the lighter material to be culled therefrom is entrained in the air current entering fan 54 and expelled with the vines. The peas themselves are too heavy to be deflected sufficiently to enter the fan. From hopper 51 they are delivered through spout 56 into any suitable container.

As above noted, some features of the invention may be used advantageously in connection with existing viners, to which they may be added at little expense in the form of suitable attachments.

In Figure 7 I have shown the cylinder 60 of the conventional viner which, in accordance with usual practice, is open at its end. A very large percentage of threshed peas is entrapped in the tangled mass of vines within such a cylinder and escapes through the open end of the cylinder with the vines. All such peas are wasted by existing machines. I propose therefore, to provide a closure 61 for the end of cylinder 60 to prevent the escape of any material except such as can be handled in one of my improved discharging wheels such as that shown at 26 in Figure 1. I mount the wheel 26 in a suitable slot 62 in the closure plate 61 and as the cylinder 60 rotates, the vines lifted in the course of its rotation will drop across the path of wheel 26 and will thereby be drawn from the viner. The loose peas, which will not be caught by the teeth 14 of the discharge wheel 26 will remain in the cylinder 60 until they can escape through its perforations.

Instead of merely discharging the vines from wheel 26 to the ground I prefer to salvage peas which remain in the pods on the vines unopened by existing vining equipment. For this purpose I provide one or two threshing drums 40 and 43 in a suitable casing 42 having baffles 41 as shown in conjunction with the harvester thresher in Figure 5. A slide at 63 beneath the drums returns to the cylinder 60 all peas which are threshed during the operation of the attachment.

While it is believed that my improved process is adequately described in connection with my disclosure of apparatus which may be used in practice thereof, I shall summarize the process as follows:

The vines are alternately tossed to maintain them loose and whirled to extend the pods centrifugally from the loosened mass. While the vines are whirled and the pods extended, the pods are caused to strike relatively fixed obstructions whereby they are either opened or stripped from the vines. The obstructions are preferably so formed that the direction of impact is oblique as it is found that this facilitates the threshing operation as well as advances the material through the machine. As above noted the process involves alternate repetition of the tossing and whirling steps for the threshing of pods which are first brought to the surface by the tossing operations.

At the conclusion of the vining operation, the vines are in each instance expelled mechanically from the machine through the centrifugal operation of a rotative discharge wheel which is ineffective to engage the pods or peas and is capable of action only on the vines.

This vine discharging wheel is so located as to receive the vines at one level and lift them by means of its teeth to a higher level, and preferably deliver them over the top of the wheel in the direction of the outlet. The teeth being inclinded in a direction opposite that of wheel rotation, and the wheel being revolved at a sufficient speed to throw the vines toward the outlet, it is possible to lift the vines away from such free peas and pods as may be entrained in them at the point of delivery and thus accomplish separation by allowing the peas and pods to drop by gravity while the vines are being lifted in another direction. By thus lifting the vines and propelling them toward the outlet, all pressures tending to crush peas or vines against relatively stationary surfaces are avoided.

I claim:

1. Apparatus of the character described comprising the combination with a rotatably mounted drum provided with vine engaging fingers, of relatively fixed baffle means in the path of pods centrifugally extruded from vines engaged by said fingers, and means for rotating said drum at a rate sufficient to extrude pods from said vines, the space between said drum and baffle means being of sufficient dimensions to allow the vines to pass without material rubbing contacts between the vines and baffles.

2. In an apparatus of the character described, the combination with a drum provided with vine engaging teeth about its exterior periphery, of casing means closely surrounding portions of said drum, said baffles being remote from other portions thereof, and baffles carried by casing portions in the path of pods centrifugally extruded from vines carried by said drum, said baffles being sufficiently remote from the drum to allow the vines to be revolved in the unobstructed intervening space with slight separation under centrifugal force to facilitate outwardly swinging movements of the pods into positions for impacting the baffles.

3. Apparatus of the character described comprising the combination of a plurality of elongated and substantially parallel drums provided with peripheral teeth, a casing provided with an inlet adjacent one end of the first of said drums and an outlet adjacent the other end of another of said drums and concave grids composed of sets of curved substantially parallel bars underneath the drums, sets of baffles above said drums at a greater distance therefrom than the concave grids, means for revolving the drums at sufficient speed to carry the vines loosely through the space between the drums and the baffles while allowing the pods to be swung against the baffles by centrifugal force, baffle means in the path of material thrown tangentially by the drums and inclined toward the outlet of said casing said last mentioned baffle means being adapted to advance the material toward the outlet during a portion of each revolution thereof, and a discharge wheel at the outlet end of the casing provided with vine engaging teeth and positioned to strip vines from said other drum for discharge from the casing.

4. The process of vining peas, which consists in revolving the vines at sufficient speed to cause pods to swing outwardly from the vines by centrifugal force, impacting the outwardly swung pods along one side of the axis of revolution and advancing the vines along said axis during a portion of each revolution.

5. The process of vining peas, which consists in raking the vines upwardly along a curved path at a sufficient speed to cause the pods to swing outwardly by centrifugal force, impacting the outwardly swung pods to release the peas, and then throwing the vines tangentially away from the pod impacting area, impacting and rearranging the vines to shake out the shelled peas and repeating the raking, impacting throwing operations.

6. The process of vining peas, which consists in engaging the vines at a plurality of points, lifting them away from shelled peas, swinging them along a curved path in unobstructed space with sufficient speed to develop pod projecting centrifugal force, and impacting the pods which are projected beyond said space to open them in a pea releasing operation and then throwing them tangentially, impacting the vines and advancing them along the axis of said curved path for a further engaging, lifting and impacting operation in a different area while feeding additional vines into the area of the first lifting, impacting and throwing operation.

7. In apparatus of the character described, the combination with a rotative cylinder provided with rack teeth, an associated concave composed of smooth surfaced parallel bars adapted to permit pea vines to be raked loosely along such bars by the cylinder teeth, a set of baffles opposed to another portion of the cylinder at a greater distance from the cylinder than said bars, and means for rotating the cylinder at sufficient speed to rake pea vines along said bars and convey them through the space between the cylinder and the baffles at sufficient speed to cause pods to swing outwardly by centrifugal force into positions for impact with the baffles.

8. In apparatus of the character described, the combination with a rotative cylinder provided with rake teeth, an associated concave composed of smooth surfaced parallel bars adapted to permit pea vines to be raked loosely along such bars by the cylinder teeth, a set of baffles opposed to another portion of the cylinder at a greater distance from the cylinder than said bars, means for rotating the cylinder at sufficient speed to rake pea vines along said bars and convey them through the space between the cylinder and the baffles at sufficient speed to cause the pods to swing outwardly by centrifugal force into position for impact with the baffles, said cylinder teeth being formed to deliver vines tangentially after passing the baffles, another set of baffles in the path of the tangentially thrown vines adapted to deflect the vines longitudinally of the cylinder, and conveying means for returning the vines to the concave bars while allowing the shelled peas to drop by gravity out of the path of the vines.

9. In a viner, the combination with a set of rotatable drums having substantially parallel axes and provided with rake teeth which are rearwardly inclined with reference to the direction of drum rotation, a concave associated with each drum and composed of substantially parallel bars curved concentrically of the drum along one side thereof and in such proximity to the drum as to permit vines to be loosely raked along the bars without material pressure, sets of baffles opposed to other portions of each drum at a greater distance therefrom than said concave bars, and means for rotating the drums in a direction to advance material from one drum to the next in the series and at a speed sufficient to develop such delivery by centrifugal force, the baffles being located in a position for impact with the heavier portions of said material during the initial outward movements thereof upon release from the restraining influence of the concave and adjacent drum and prior to tangential delivery of the vines.

10. In a viner, the combination with an elongated rotary drum provided with teeth inclined in a direction opposite that of drum rotation, a concave composed of parallel smooth surfaced bars substantially concentric to the drum and adapted to hold vines to the drum for movement therewith during a portion of the drum revolution, a set of baffles opposed to the drum at a greater distance therefrom than said concave bars and positioned for impact with outwardly moving pods received from the delivery ends of the concave bars, and another set of baffles spaced from the drum at a sufficient distance to allow the vines to be thrown from the drum tangentially, said last mentioned baffles being inclined with reference to the planes in which the drum teeth travel and adapted to deflect the vines longitudinally of the drum, and means for returning the vines to concave bars parallel with the bars which first received them, said returning means and concave bars being adapted to permit gravital separation of the contents of opened pods from the vines after each impacting operation.

11. In apparatus of the character described, the combination with a viner casing having an outlet for threshed vines, of a toothed wheel positioned and adapted to receive such vines at one level and to lift and propel them in the direction of the outlet at another level independently of free peas and pods entrained therein at the level of their engagement of said wheel, the teeth on said wheel being inclined in a direction opposite that of rotation, and the wheel having driving connections for rotating it at a sufficient speed to lift and throw the vines in the direction of the outlet.

12. The process of vining peas which consists in gently picking up and lifting the vines in a loose uncompacted condition and swinging them upwardly along a curved unobstructed path of circularly swinging overshot movement with sufficient speed to extrude the pods outwardly from the vines and partially separate the vines by centrifugal force, impacting the outwardly swung pods to relase the peas therefrom, and then releasing the vines, loosely rearranging them and repeating the lifting, swinging, pod impacting and vine releasing operations in cycles of non-compressing, non-compacting, and non-crushing operations.

13. In a pea viner, a vine actuating drum provided with picking fingers inclined in a direction opposite that of drum rotation, means for feeding vines to the drum in uncompacted condition, means for actuating the drum in a direction to pick up and convey the vines in an overshot movement and at sufficient speed to cause an initial partial separation of the vines from each other and an extrusion of pods by centrifugal force, and a subsequent tangential delivery from said fingers, pod breaking baffles in the path of the pods so extruded, said baffles being located at a sufficient distance from the drum to allow the vines to freely pass in unobstructed space while engaged by the drum fingers, and a set of downwardly extending inclined baffles in the path of the delivered vines, adapted to be positioned to direct the vines along the drum for successive cycles of lifting, pod extruding and impacting operations.

CLARENCE H. PLUMMER.